US008553253B2

(12) United States Patent
Murayama (10) Patent No.: US 8,553,253 B2
(45) Date of Patent: Oct. 8, 2013

(54) PRINTING APPARATUS AND CONNECTION INFORMATION PRESENTATION METHOD

(75) Inventor: Michihei Murayama, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 938 days.

(21) Appl. No.: 11/677,197

(22) Filed: Feb. 21, 2007

(65) Prior Publication Data

US 2007/0201081 A1    Aug. 30, 2007

(30) Foreign Application Priority Data

Feb. 24, 2006   (JP) ................. 2006-048973

(51) Int. Cl.
*G06F 3/12* (2006.01)
*H04M 1/66* (2006.01)
*H04M 3/42* (2006.01)
*H04M 1/00* (2006.01)
*H04B 1/38* (2006.01)

(52) U.S. Cl.
USPC ....... 358/1.15; 455/411; 455/414.1; 455/557; 455/556.1

(58) Field of Classification Search
USPC ................ 455/41.1–41.3, 556.1, 557, 411, 455/414.1; 235/462.01, 462.05, 462.06; 380/270; 101/2, 494; 355/133, 18; 358/1.15
See application file for complete search history.

(56) References Cited

U.S. PATENT DOCUMENTS

| 7,455,229 | B2 | 11/2008 | Tanaka |
| 2001/0054648 | A1* | 12/2001 | Shioda et al. ............. 235/494 |
| 2002/0010759 | A1* | 1/2002 | Hitson et al. ............. 709/219 |
| 2002/0089653 | A1* | 7/2002 | Iida ............................ 355/40 |
| 2003/0202164 | A1* | 10/2003 | Iida ............................ 355/40 |
| 2003/0236709 | A1* | 12/2003 | Hendra et al. ............ 705/26 |
| 2004/0054797 | A1* | 3/2004 | Lin et al. .................. 709/229 |
| 2004/0192206 | A1* | 9/2004 | Hirvonen ................ 455/41.2 |
| 2005/0054342 | A1* | 3/2005 | Otsuka ................. 455/426.2 |
| 2005/0279833 | A1* | 12/2005 | Tanaka ................ 235/462.46 |

FOREIGN PATENT DOCUMENTS

| JP | 2004-230836 A | 8/2004 |
| JP | 2006-001063 A | 1/2006 |

* cited by examiner

*Primary Examiner* — Jean Gelin
*Assistant Examiner* — Dung Hong
(74) *Attorney, Agent, or Firm* — Carter, DeLuca, Farrell & Schmidt LLP

(57) ABSTRACT

A communication apparatus which presents connection information necessary for wireless connection to another communication apparatus determines whether wireless connection to the other communication apparatus is permitted upon receiving a connection request from the other communication apparatus. If it is determined that wireless connection is not permitted, the apparatus presents connection information necessary for wireless connection.

7 Claims, 12 Drawing Sheets

PRINTING APPARATUS AND CONNECTION INFORMATION PRESENTATION METHOD

BACKGROUND OF THE INVENTION

1. Field of the Invention

The present invention relates to a technique of presenting connection information necessary for wireless connection to another communication apparatus.

2. Description of the Related Art

Recently, it is common practice to connect a portable terminal represented by a portable phone to a device such as a printer by using a wireless interface such as Bluetooth® and execute printing.

However, to perform printing by connection via the above-described wireless interface, normally, the user must search for connectable devices first on the portable terminal. Then, he/she needs to select a desired device to be connected and execute a connection process.

In this method, the user may find too many devices in a course of processes and be unable to select the desirable device. Additionally, if a password (to be referred to as a PIN code hereinafter) necessary for connection is required of the user who is going to actually perform a connection process, he/she may have no means for knowing the value, and connection may be impossible.

In printing using a wireless interface such as Bluetooth®, the host side is often unable to acquire the print setting and print environment (e.g., paper size, ink type, and print layout) of a printer before printing. For this reason, the user cannot know the print result unless actual printing is completed, resulting in considerable inconvenience.

SUMMARY OF THE INVENTION

The present invention is to cause a communication apparatus to present connection information necessary for wireless connection to another communication apparatus.

Moreover, the present invention is to present information such as print setting and print environment together with connection information necessary for wireless connection.

According to an aspect of the present invention, there is provided a communication apparatus which presents connection information necessary for wireless connection to another communication apparatus, comprising: determination device adapted to determine whether wireless connection to said other communication apparatus is permitted upon receiving a connection request from said other communication apparatus; and presentation device adapted to present the connection information necessary for wireless connection if wireless connection is not permitted.

According to another aspect of the present invention, there is provided a communication apparatus which presents authentication information necessary for wireless connection to another communication apparatus, comprising: device adapted to receive a presentation request of authentication information necessary for wireless connection to said other communication apparatus; and presentation device adapted to present the authentication information necessary for wireless connection based on the presentation request.

According to still another aspect of the present invention, there is provided a connection information presentation method of presenting connection information necessary for wireless connection to another communication apparatus, comprising the steps of: determining whether wireless connection to said other communication apparatus is permitted upon receiving a connection request from said other communication apparatus; and presenting the connection information necessary for wireless connection if wireless connection is not permitted.

According to still another aspect of the present invention, there is provided an authentication information presentation method of presenting authentication information necessary for wireless connection to another communication apparatus, comprising the steps of: receiving a presentation request of authentication information necessary for wireless connection to a portable terminal; and presenting the authentication information necessary for wireless connection based on the presentation request.

Further features of the present invention will become apparent from the following description of exemplary embodiments with reference to the attached drawings.

DESCRIPTION OF THE EMBODIMENTS

The best mode for carrying out the present invention will be described below with reference to the accompanying drawings.

FIGS. 1 to 4 are views for explaining the outline of an operation according to the embodiment. In this embodiment, a portable phone will be exemplified as a most familiar portable terminal. Bluetooth® that is expected to be installed in many portable phones soon will be exemplified as a wireless interface. A printing apparatus will be exemplified as a device to connect to the portable terminal.

The portable terminal as an effective host is not limited to a portable phone and may be a PDA (Personal Digital Assistant) or mobile PC (Personal Computer) if it has portability. Recent portable phones and PDAs have a camera function as standard equipment. Considering the function of directly receiving information from, e.g., a QR code, a portable phone capable of analyzing a QR code is the best host.

Figure 1:
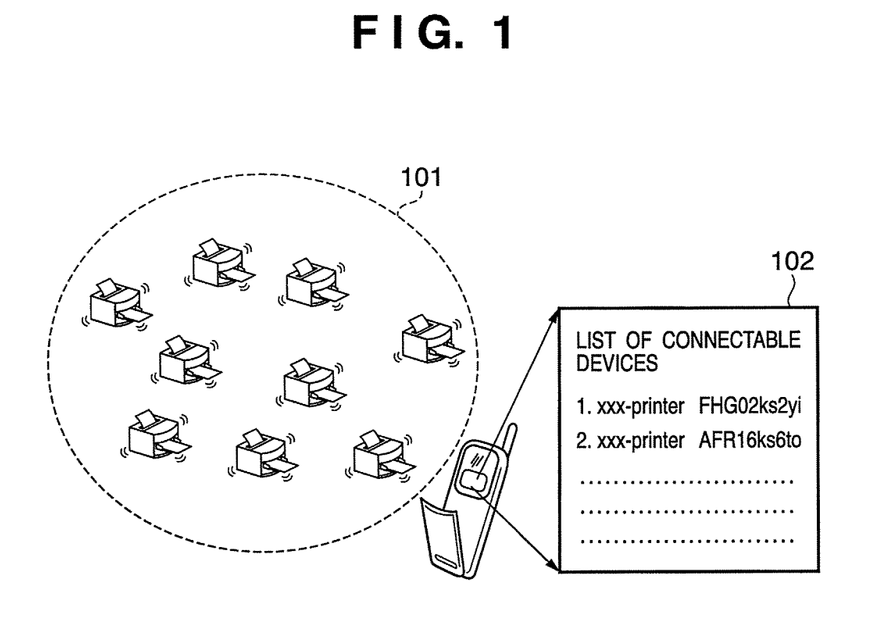
FIG. 1 is a view showing the relationship between a portable phone and a printing apparatus having a wireless function.

FIG. 1 is a view showing the relationship between a portable phone and a printing apparatus having a wireless function. When printing is to be executed from the portable phone, normally, the portable phone searches for connectable printing apparatuses. At this time, pieces of information of a plurality of connectable printing apparatuses 101 are displayed on a display device 102 of the portable phone in the detection order. The portable phone having a poor display function may scroll the view if all connectable devices (printing apparatuses) cannot be displayed on the screen at once.

Figure 2:
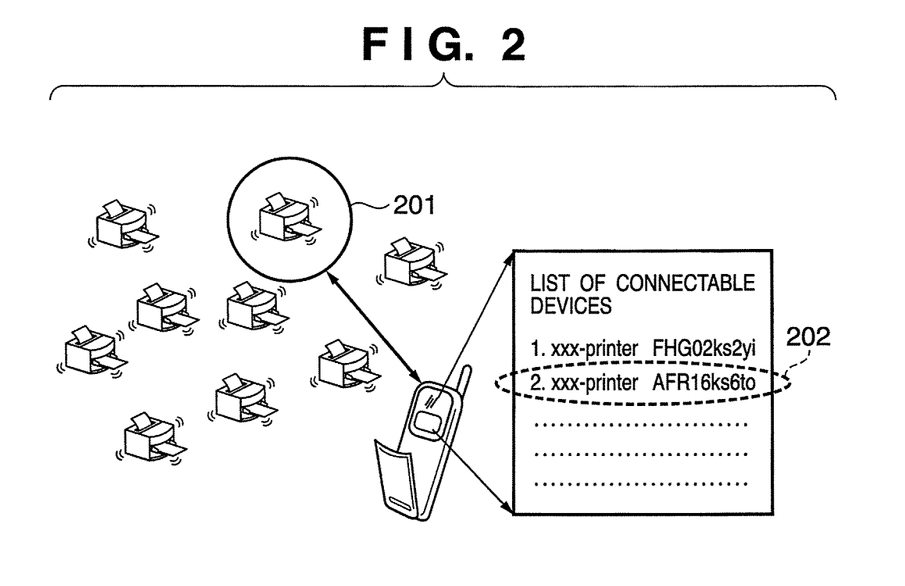
FIG. 2 is a view showing a situation wherein a printing apparatus 201 is searched for from a plurality of connectable printing apparatuses displayed on a display device 202 of a portable phone, and the user confirms that its indication 202 exists at the second place from the top, selects the printing apparatus, and executes connection.

FIG. 2 is a view showing a situation wherein a printing apparatus 201 is searched for from a plurality of connectable printing apparatuses displayed on a display device 202 of a portable phone, and the user confirms that its indication 202 exists at the second place from the top, selects the printing apparatus, and executes connection.

Figure 3:
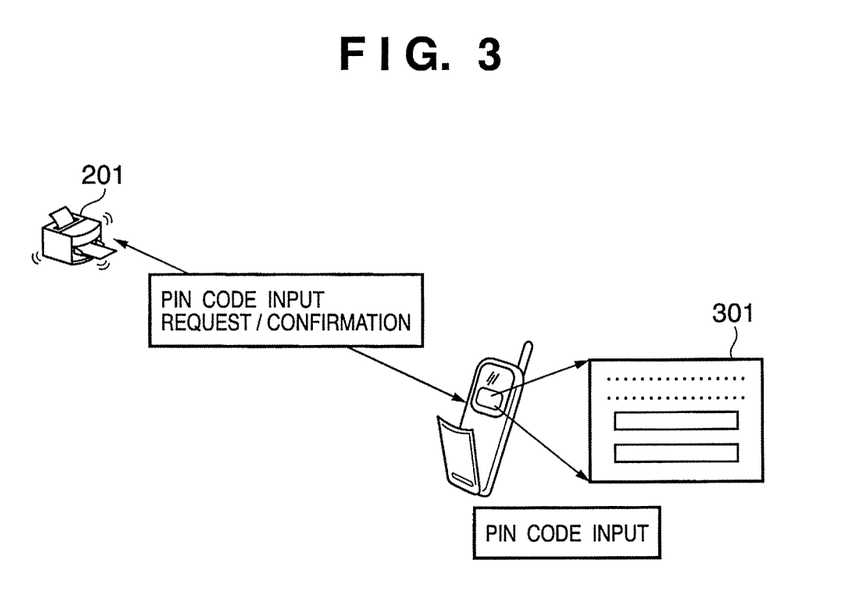
FIG. 3 is a view showing a situation wherein after the printing apparatus 201 is selected from the portable phone in FIG. 2, the two devices are connected.

FIG. 3 is a view showing a situation wherein after the printing apparatus 201 is selected from the portable phone in FIG. 2, the two devices are connected. Normally, when the portable phone sends a connection request to the selected printing apparatus 201, the printing apparatus prompts the portable phone to input a PIN code value. The PIN code is normally called a device ID and set for each wireless device. The PIN code corresponds to a password required for access.

In wireless connection, the printing apparatus 201 normally inquires of the host (portable phone), which has sent the connection request, about the PIN code to identify whether connection to the printing apparatus 201 is permitted for the host.

If a host is set as a commonly-used printing apparatus, the device ID is input in advance as information necessary for connection. Hence, the portable phone can easily connect and execute printing without a cumbersome operation. However, a portable phone or portable device, which is expected to temporarily connect to a printing apparatus and execute printing away from home, can hardly perform connection setting.

This embodiment is related to a system which assumes to make a portable terminal easily connect to a printing apparatus and accurately easily execute printing under such an environment.

Under the circumstance shown in FIG. 3, if the printing apparatus requires a PIN code of the user, and he/she knows the PIN code in advance by some method, the PIN code is directly input to an input window 301. Connection to the printing apparatus and printing can be done by inputting the PIN code. However, this is a rare case.

In this embodiment, even when the host (portable terminal) does not know the PIN code in advance, the printing apparatus interprets it as a "print request from a host that does not know the PIN code". If no correct PIN code is input after the elapse of a predetermined time, the printing apparatus side presents the information of the PIN code necessary for connection to the host.

Figure 4:
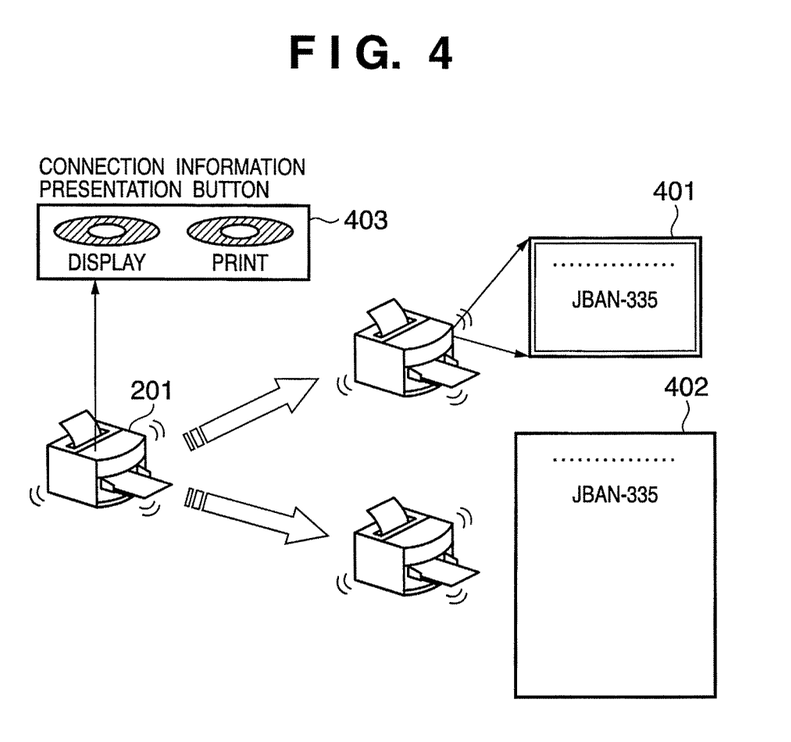
FIG. 4 is a view showing a method of causing a printing apparatus to present connection information necessary for wireless connection.

More specifically, as shown in FIG. 4, if the printing apparatus 201 has a display device, the PIN code is displayed on a screen 401 of the display device. Alternatively, the PIN code is automatically printed on a paper sheet 402. PIN code display and printing can also be switched by presetting via a connection information presentation button 403 of the printing apparatus 201.

Hence, the user can connect the portable terminal to the printing apparatus 201 by inputting the displayed or printed PIN code to the PIN code input window 301 shown in FIG. 3.

Recently, a single portable phone having a camera function as standard equipment can read a QR code and receive data. When the displayed or printed PIN code is converted into a QR code, as indicated by 501 or 502 in FIG. 5, and displayed or printed, setting to the host can be more simplified.

A QR code is formed by converting a PIN code expressed by alphanumeric characters into image data. It is more advantageous in the term of security as compared to a PIN code that is displayed or printed.

Figure 5:
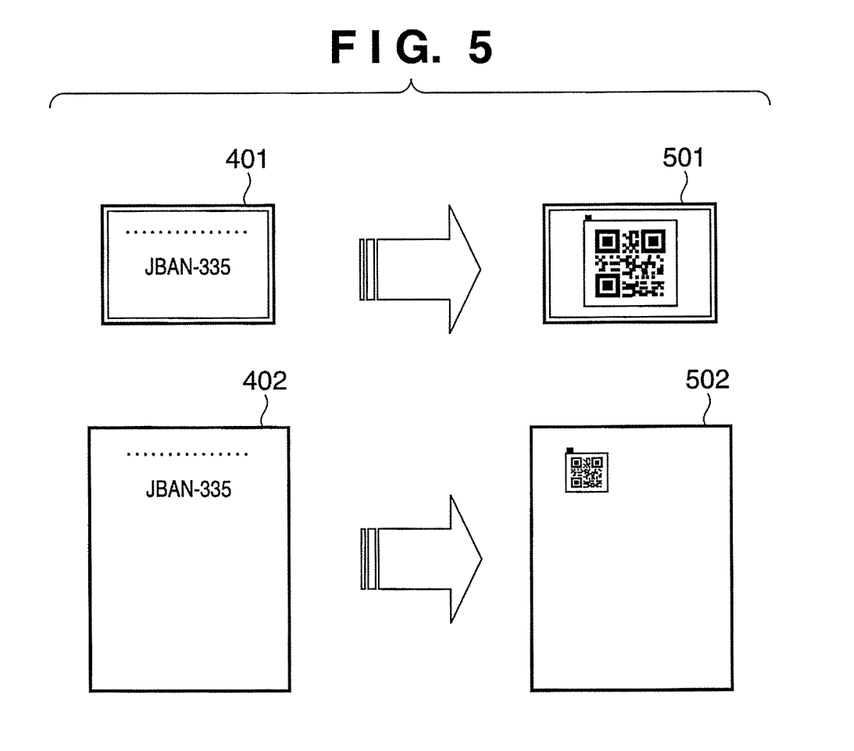
FIG. 5 is a view showing a state wherein the connection information shown in FIG. 4 is converted into a QR code, displayed, and printed.

In the example illustrated in FIGS. 4 and 5, only the device ID (PIN code) necessary for pairing the portable phone with the printing apparatus is displayed. However, wireless connection is often not bidirectional. An example is Bluetooth®. In this communication form, it is impossible to acquire information on the printing apparatus side before printing.

To allow the user to more easily print according to his/her intention, it is necessary to provide, to the portable terminal, not only the information (PIN code) for pairing shown in FIGS. 4 and 5 but also various kinds of information in printing on the printing apparatus side.

Figure 6:
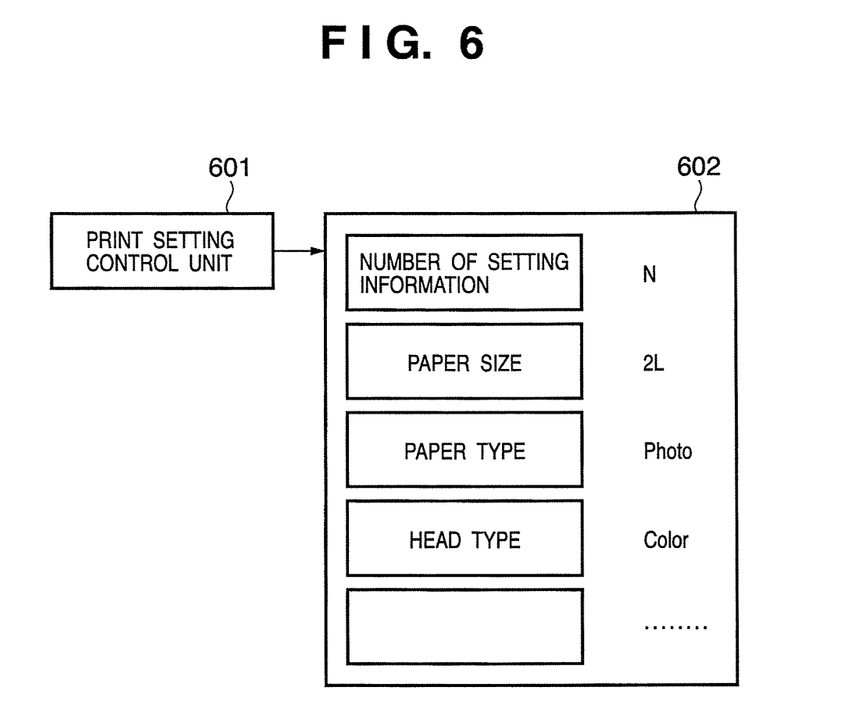
FIG. 6 is a view showing various kinds of information in printing provided from a printing apparatus to a portable terminal.

FIG. 6 is a view showing various kinds of information in printing provided by the printing apparatus to the portable terminal. Referring to FIG. 6, a print setting control unit 601 incorporated in the printing apparatus manages the print environment on the printing apparatus side which is acquired automatically or set in the printing apparatus. The internal arrangement of the printing apparatus will be described later in more detail.

As indicated by 602, the print environment managed by the print setting control unit 601 contains the number of setting information, paper size, paper type, and head type. Especially when printing is executed from a portable terminal such as a portable phone, the print environment information is very important because the print contents are considerably limited.

Figure 7:
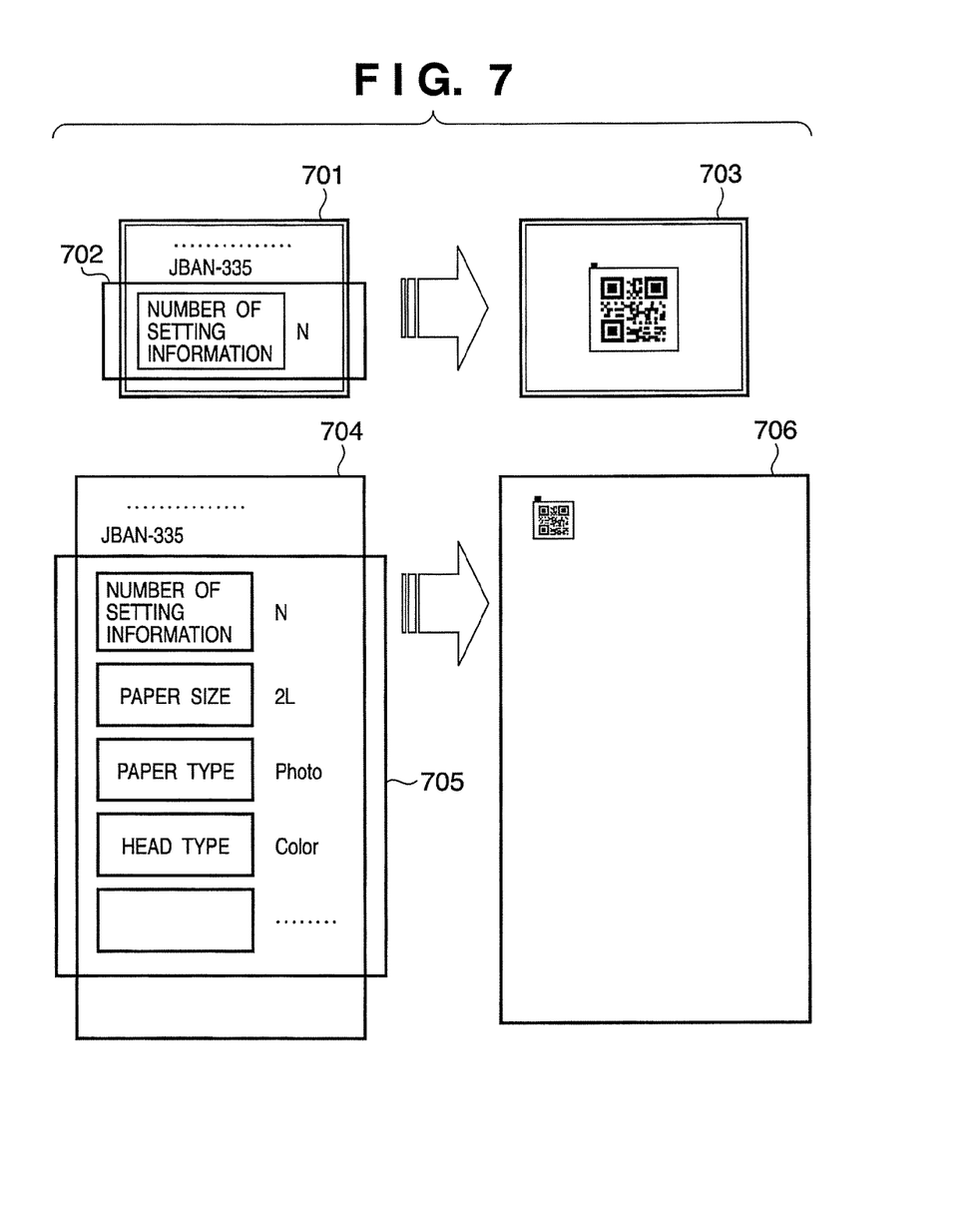
FIG. 7 is a view showing a state wherein print environment information shown in FIG. 6 is converted into a QR code, displayed, and printed.

FIG. 7 is a view showing a state wherein the print environment information shown in FIG. 6 is converted into a QR code, displayed, and printed. Referring to FIG. 7, reference numeral 701 to 703 indicate a case wherein print environment information of a printing apparatus is read by a portable terminal represented by a portable phone with poor display capability. Reference numeral 701 denotes a display device of a printing apparatus; and 702, print environment information presented before printing. The display device cannot display all pieces of information because of its poor window display capability. The user needs to scroll the view to acquire all pieces of information.

Reference numeral 704 indicates a case wherein the same information as described above is printed on a paper sheet. All pieces of information can be printed as indicated by 705 because a paper sheet has a high expression capability. Even in this case, however, input is cumbersome if the sole input means of the portable terminal is a numeric keypad.

Reference numeral 703 denotes information displayed on the same screen as a QR code together with a PIN code. Since a display device with a certain kind of screen provided on a printing apparatus can display an image such as a photo, information can be displayed as a QR code.

If read from the portable terminal is difficult because of the size of the display device, the user can print the QR code contained in a PIN code, as indicated by 706.

The internal arrangement of a printing apparatus having the print setting control unit 601 will be described with reference to FIG. 8.

Figure 8:
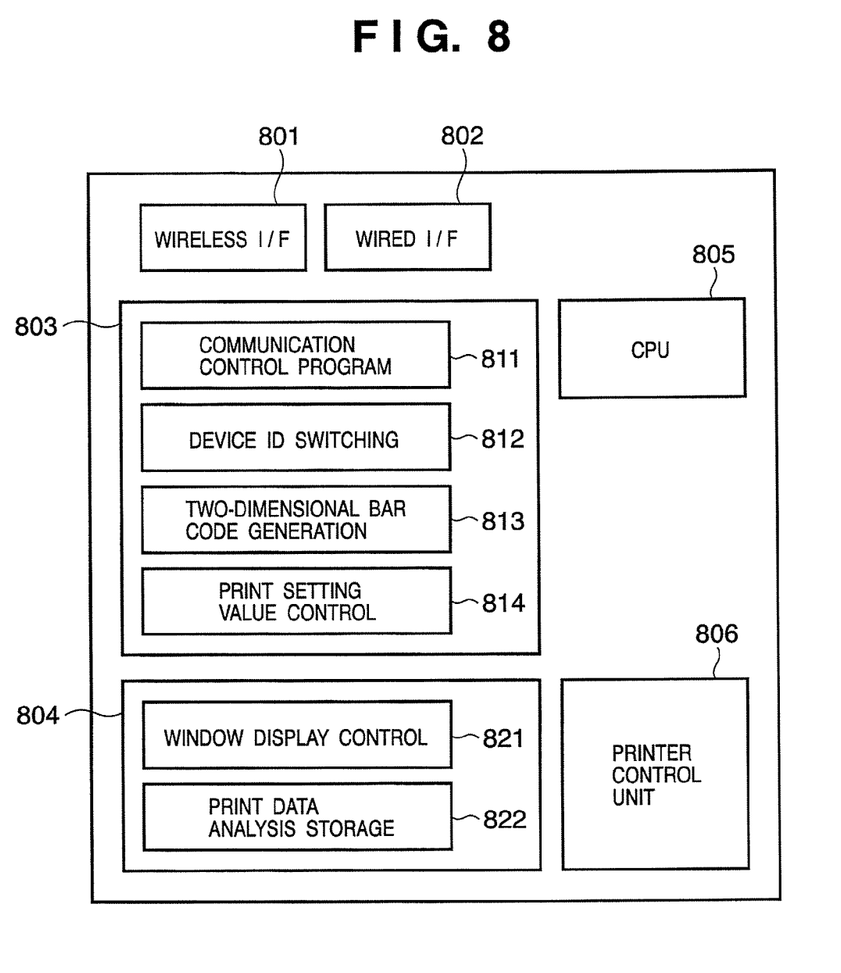
FIG. 8 is a functional block diagram showing an example of the arrangement of a printing apparatus according to the embodiment.

FIG. 8 is a functional block diagram showing an example of the arrangement of the printing apparatus according to this embodiment. Referring to FIG. 8, reference numeral 801 denotes a wireless interface (I/F); and 802, a wired interface (I/F). A functional module 803 connects the apparatus using a wireless/wired device, converts a PIN code and print setting values into a QR code, and displays or prints it. A module 804 controls received data.

A CPU 805 connects to an external device via the wireless interface 801 or wired interface 802 and, in accordance with a request, executes print control of received data by controlling the module 803 or 804 and overall control until the actual print operation. A printer control unit 806 executes the actual print operation under the control of the CPU 805.

A communication control program 811 in the functional module 803 controls connection to an external host by controlling the wireless I/F 801 or wired I/F 802. A device ID switching unit 812 sets, stores, changes, and confirms an ID code called a device ID (PIN code in this example) which is used to raise the connection security. A two-dimensional bar code generation unit 813 converts the value of a device ID into a QR code in accordance with a request. A print setting value control unit 814 manages and saves the print environment information of the printing apparatus and, as needed, outputs/inputs the values. The print environment information contains, e.g., the size and quality of a currently set print paper sheet, printhead type (color/monochrome), and print mode (the number of pages to be printed on one paper sheet).

A window display control unit 821 in the module 804 controls a window when the printing apparatus has a display device. A print data analysis storage unit 822 generates print data based on the proper function of the printing apparatus or received data and stores the print data.

A series of operations of the printing apparatus to receive a connection request from a portable terminal and display or print a PIN code will be described next with reference to FIG. 9.

Figure 9:
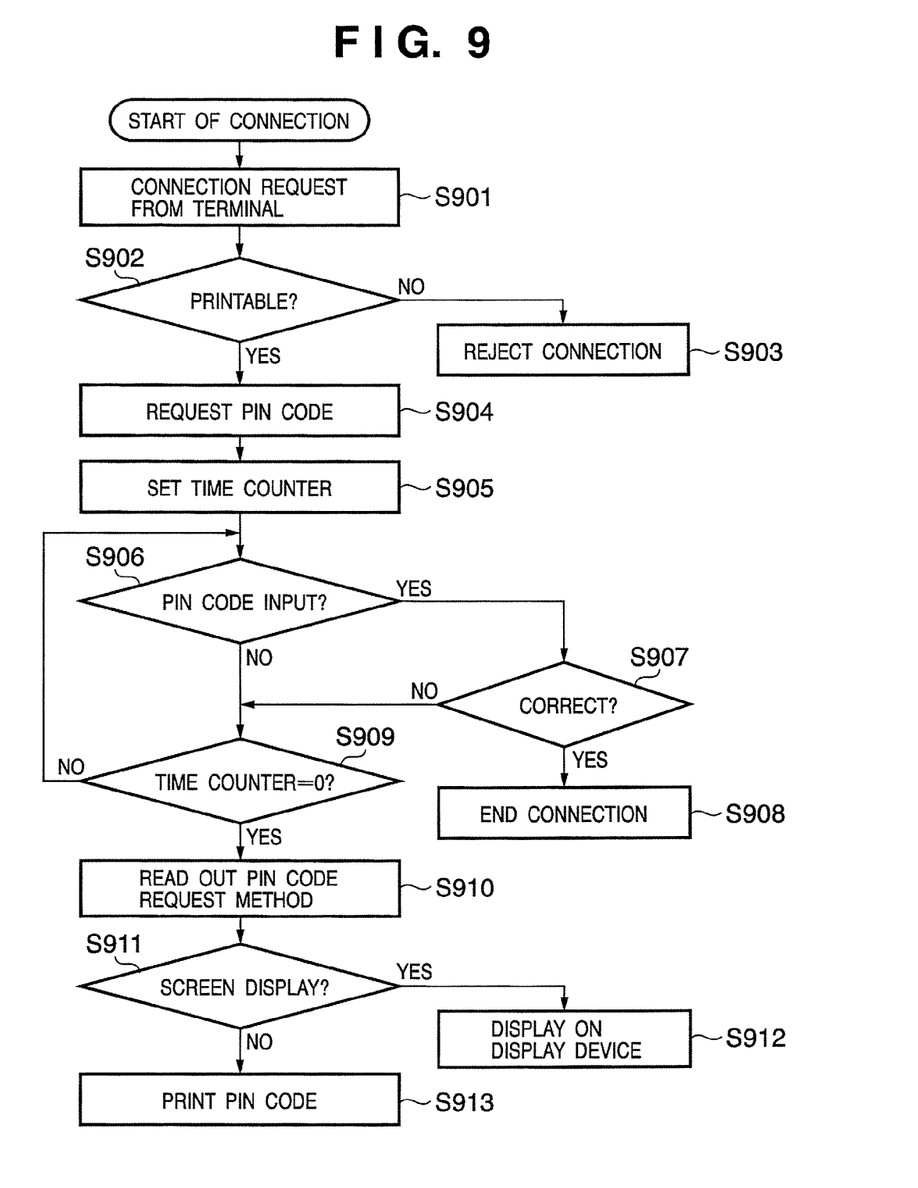
FIG. 9 is a flowchart showing the process of the printing apparatus according to the embodiment.

FIG. 9 is a flowchart showing the process of the printing apparatus according to the embodiment. For example, assume connection from a portable phone with Bluetooth® to the printing apparatus. The portable phone side searches for the list of connectable devices using Bluetooth®. A plurality of printing apparatuses 101 are found and displayed, as shown in FIG. 1. The user selects the printing apparatus 201 as a connection target, as shown in FIG. 2. In this state the flowchart in FIG. 9 starts.

When the portable phone selects the printing apparatus as a connection target from the list of printing apparatuses, the printing apparatus receives a connection request from the portable phone in step S901. In step S902, the printing apparatus confirms whether it is in a printable state. If the result is NO in step S902, the process advances to step S903 to notify the portable phone of the connection disabled state and rejects connection.

If the apparatus is printable, the process advances to step S904 to request the user to input a unique PIN code set for the device to confirm whether connection to the portable phone is permitted. When the printing apparatus sends the "PIN code request" to the portable phone, the display device of the portable phone displays the window 301 to prompt the user to input the PIN code.

In step S905, for example, a time counter is set. In step S906, it is confirmed whether the user of the portable phone inputs a correct PIN code within the set time. If the user inputs a PIN code before timeout, the process advances to step S907 to determine whether the PIN code is correct. If the PIN code is correct, the process advances to step S908 to execute a normal connection process, and the process is ended.

If the PIN code is not correct in step S907, the process advances to step S909 to decrement the time counter and determine whether the counter value is "0". If the counter value is not "0", the process returns to step S906 to repeat the above-described process.

If the counter value is "0", the process advances to step S910 to present the PIN code necessary for connection to the user. More specifically, the printing apparatus reads out a providing method preset by the user and executes "screen display" or "printing" according to the setting, as described with reference to FIG. 4. That is, if screen display is set in step S911, the process advances to step S912 to display the PIN code on the screen. If printing is set, the process advances to step S913 to print the PIN code.

A process of causing the portable phone to read setting items after the printing apparatus presents the connection information by displaying or printing the QR code will be described next with reference to FIG. 10.

Figure 10:
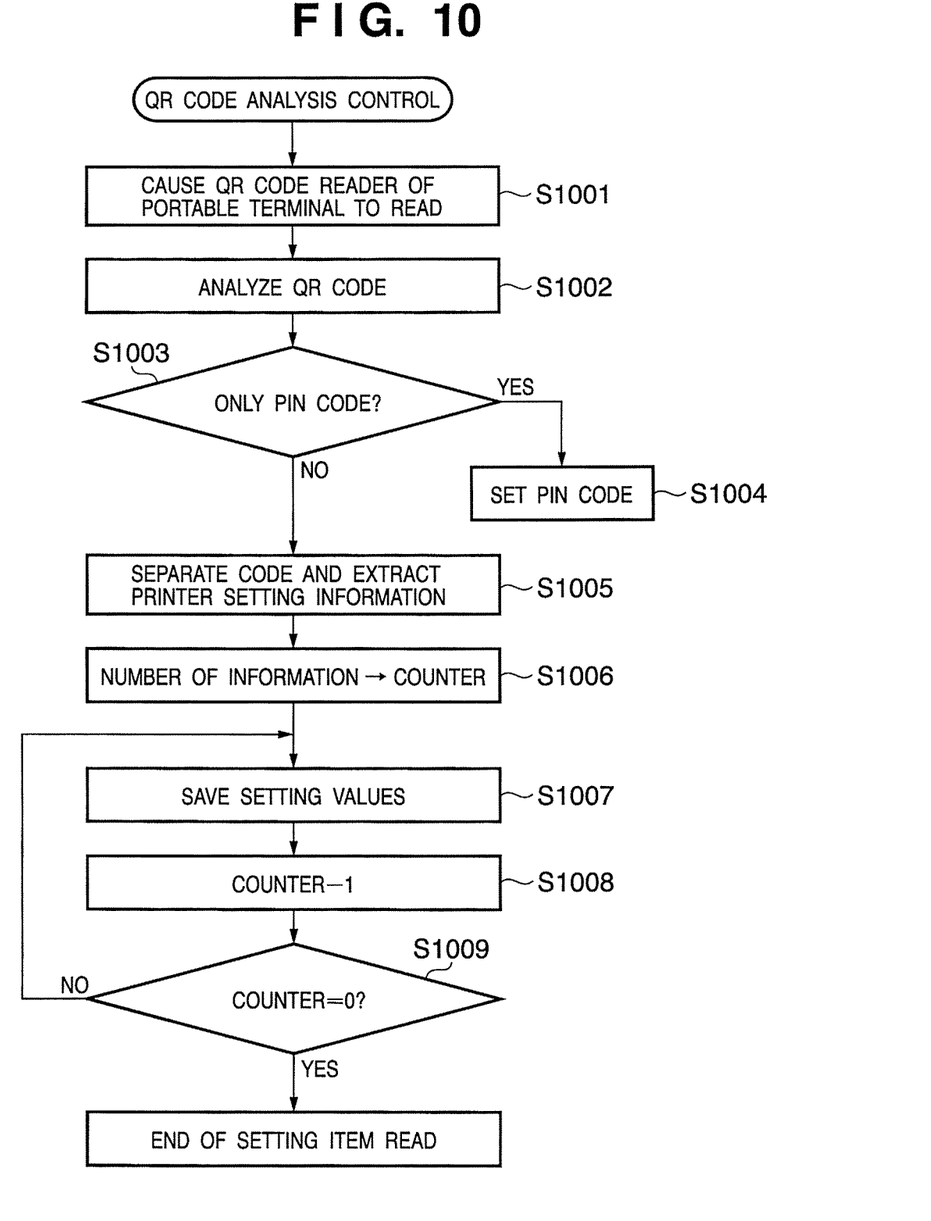
FIG. 10 is a flowchart showing a process of causing the portable phone to analyze a QR code.

FIG. 10 is a flowchart showing a process of causing the portable phone to analyze the QR code. In step S1001, the user of the portable phone activates a QR code reader to read the QR code provided from the printing apparatus. In step S1002, the contents of the read QR code are analyzed. In step S1003, it is confirmed whether the QR code contains only a "PIN code" or also "print environment information necessary for printing (FIG. 7)". If the QR code contains only a PIN code, the process advances to step S1004 to execute a normal connection operation.

If the QR code also contains "print environment information necessary for printing" in step S1003, the process advances to step S1005 to separate the PIN code and extract the print environment information. In step S1006, the number of information at the top of the print environment information is set in the counter. In step S1007, the print environment information is read out and saved as provided setting values necessary for printing.

In step S1008, the print information counter set in step S1006 is decremented. If the counter value is not "0" in step S1009, the process returns to step S1007 to repeat the above-described process. When all values of the print environment information are saved as setting items, the process is ended.

Normally, in printing using a communication interface such as Bluetooth®, it is impossible to acquire the print environment information of the printing apparatus in advance. A problem arises only when actual printing is executed. In this embodiment, not only connection information but also print environment information of the printing apparatus can be provided to the host before printing. It is very effective in printing from a host like a portable terminal.

When the portable phone acquires the PIN code for connection and print environment information before printing, the setting contents of the printing apparatus sometimes do not match the setting contents desired for printing. In this case, the paper size or print format on the printing apparatus side may be changed and indicated as a QR code.

When the user of the portable phone acquires the QR code representing print environment information of the printing apparatus, and desired printing is impossible under the current settings, the print environment of the printing apparatus, e.g., the paper size, ink head, or print layout must be changed. In this case, the changed information can be presented to the user again as a QR code by pressing the connection information presentation button 403 shown in FIG. 4.

Figure 11:
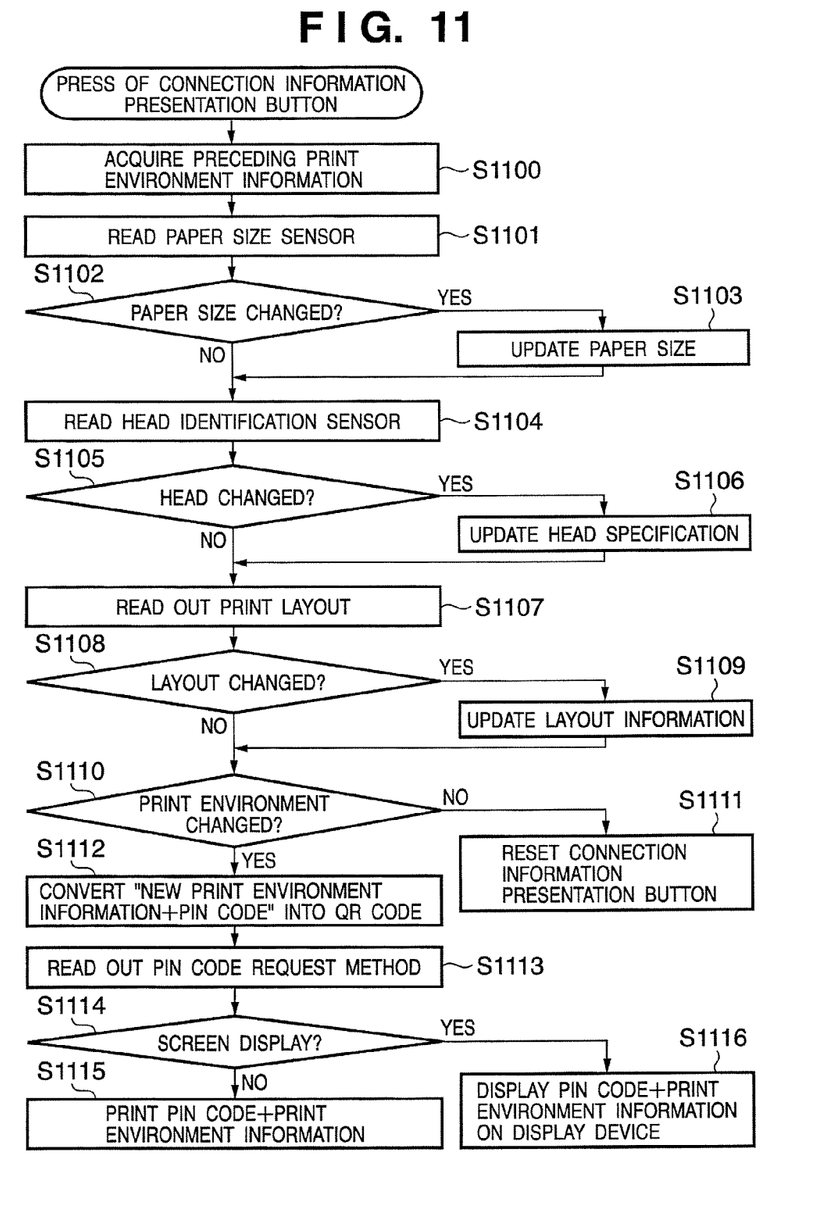
FIG. 11 is a flowchart showing a process of changing print environment information if print environment information presented to the portable phone is different from setting contents desired by the user.

FIG. 11 is a flowchart showing a process of changing print environment information if print environment information presented to the portable phone is different from setting contents desired by the user for printing. In step S1100, the latest print environment information managed and saved by the print setting value control unit 814 is read out. In step S1101, information is read out from a sensor that detects the paper size. In step S1102, the information read out in step S1101 is compared with the latest print environment information sent to the portable phone. If the two pieces of information do not match, the process advances to step S1103 to update the paper size information.

Ink head information is acquired from a sensor that identifies the ink head in step S1104 and compared with preceding information in step S1105. If the information has changed, the process advances to step S1106 to change the ink head specification. Information about print layout currently set in the printing apparatus is read out in step S1107 and compared with preceding information in step S1108. If the pieces of information do not match, the process advances to step S1109 to update the print layout information.

In step S1110, it is confirmed whether the print environment information has changed. If the information has not changed at all, the process advances to step S1111 to reset the connection information presentation button 403. The process is ended without executing any subsequent process. The contents presented before may be redisplayed or printed again.

If the information has changed in step S1110, the process advances to step S1112 to cause the two-dimensional bar code generation unit 813 to generate a QR code containing the new print environment information and PIN code. In step S1113, the PIN code request method is read out. In step S1114, it is determined whether the request indicates screen display or printing of the PIN code. For printing, the process advances to step S1115 to make the printer control unit 806 print. For screen display, the process advances to step S1116 to make the window display control unit 821 display the PIN code on the screen.

According to this embodiment, upon receiving a connection request from the portable phone, the printing apparatus can automatically present, to the host, PIN code information necessary for connection and information about current print environment settings of the printing apparatus by using characters or QR code. Even when the settings have changed, it is possible to easily change the information by the same operation.

The user can easily connect to the printing apparatus without preparation. Simultaneously providing the "current print setting environment of the printing apparatus" facilitates various print settings and minimizes print failures.

In this embodiment, the printing apparatus to be connected is selected and specified on the portable phone, and the printing apparatus presents connection information and print setting environment information. The present invention is also applicable to the following utilization.

For example, before sending a connection request to the printing apparatus, the portable phone acquires connection information directly from the printing apparatus and then connects to it.

Figure 12:
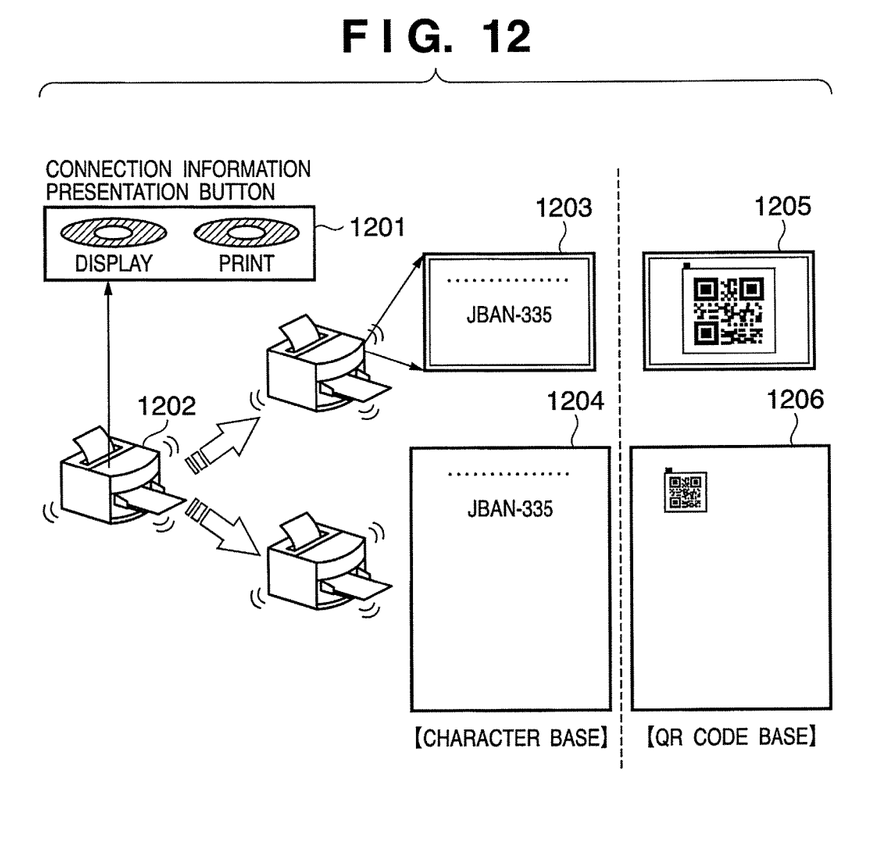
FIG. 12 is a view for explaining a utilization method according to a modification to the embodiment.

FIG. 12 is a view for explaining a presentation method according to a modification to the embodiment. A printing apparatus 1202 shown in FIG. 12 executes display 1203 or print 1204 of a character string containing only a PIN code or both a PIN code and print setting information by operating a connection information presentation button 1201. The printing apparatus also converts the character string into a QR code and executes display 1205 or print 1206 of the QR code.

Hence, many recent portable terminals having a function of reading a QR code can easily execute connection and printing.

As described above, according to the embodiment, if a user who must urgently print using, e.g., a portable terminal away from home should print using a printing apparatus having a wireless interface, he/she can easily connect the portable terminal to the printing apparatus and print.

It is also possible to easily present setting contents necessary for printing using the connected printing apparatus without any complex operations and settings so that the portable terminal can easily do setting and printing.

The present invention is also applicable to a system including a plurality of devices (e.g., host computer, interface device, reader, and printer) or an apparatus (e.g., copying machine or facsimile apparatus) including a single device.

The object of the present invention is achieved even by supplying a recording medium which records software program codes for implementing the functions of the above-described embodiment to the system or apparatus and causing the computer (or CPU or MPU) of the system or apparatus to read out and execute the program codes stored in the recording medium.

In this case, the program codes read out from the recording medium implement the functions of the above-described embodiment by themselves, and the recording medium which stores the program codes constitutes the present invention.

Examples of the recording medium usable to supply the program codes are a flexible disk, hard disk, optical disk, magnetooptical disk, CD-ROM, CD-R, magnetic tape, nonvolatile memory card, and ROM.

The functions of the above-described embodiment are implemented not only when the computer executes the read-out program codes but also when the OS (Operating System) running on the computer partially or wholly executes actual processing based on the instructions of the program codes.

The functions of the above-described embodiment are also implemented when the program codes read out from the recording medium are written in the memory of a function expansion board inserted into the computer or a function expansion unit connected to the computer, and the CPU of the function expansion board or function expansion unit partially or wholly executes actual processing based on the instructions of the program codes.

According to the present invention, a communication apparatus such as a printing apparatus presents connection information necessary for wireless connection to another communication apparatus such as a portable terminal so that the other communication apparatus can easily wirelessly connect to the communication apparatus. If the communication apparatus is a printing apparatus, the communication apparatus can easily wirelessly connect to the printing apparatus and execute printing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-048973, filed Feb. 24, 2006, which is hereby incorporated by reference herein in its entirety.

What is claimed is:

1. A printing apparatus comprising:
an authentication unit that requests authentication information from a wireless communication partner apparatus and authenticates the wireless communication partner apparatus based on the authentication information;

a wireless connecting unit that performs the wireless connection with the wireless communication partner apparatus when the authentication unit receives correct authentication information from the wireless communication partner apparatus;

a generation unit that generates a code image in which both the correct authentication information and print setting information are converted into a code represented by an image, wherein the print setting information includes at least one of a size of a currently set print paper sheet, quality of a currently set print paper sheet, a print type that indicates a color or monochrome type, and a print mode that indicates the number of pages to be printed on one paper sheet; and a presentation unit that presents the code image generated by the generation unit to a user, when the authentication unit does not receive correct authentication information until a predetermined time elapses.

2. The apparatus according to claim 1, wherein said presentation unit displays or prints the code image in accordance with a setting by the user.

3. The apparatus according to claim 2, wherein the code image is a multidimensional code image.

4. The apparatus according to claim 1, wherein said presentation unit displays or prints the code image in which either the authentication information or the print setting information is converted into one code represented by an image in accordance with a setting by the user.

5. The apparatus according to claim 1, wherein said presentation unit displays or prints at least one of the authentication information and the print setting information in accordance with a setting by the user.

6. A method for controlling a printing apparatus, comprising:

requesting authentication information from a wireless communication partner apparatus;

authenticating the wireless communication partner apparatus based on the authentication information;

performing the wireless connection between the printing apparatus and the wireless communication partner apparatus when an authentication unit of the printing apparatus receives correct authentication information from the wireless communication partner apparatus;

generating a code image in which both the correct authentication information and print setting information are converted into a code represented by an image, wherein the print setting information includes at least one of a size of a currently set print paper sheet, quality of a currently set print paper sheet, a print type that indicates a color or monochrome type, and a print mode that indicates the number of pages to be printed on one paper sheet; and presenting the generated code image to a user, when the authentication unit does not receive correct authentication information until a predetermined time elapses.

7. A non-transitory computer-readable recording medium which records a program to cause a computer to execute the method of claim 6.

* * * * *